United States Patent [19]
Korpi

[11] Patent Number: 5,636,911
[45] Date of Patent: Jun. 10, 1997

[54] DOUBLE DRIVE SPROCKET

[75] Inventor: John G. Korpi, Wayne County, Mich.

[73] Assignee: The United States of America as represented by the Secretary of the Army, Washington, D.C.

[21] Appl. No.: 605,347

[22] Filed: Feb. 16, 1996

[51] Int. Cl.$^6$ .............................. B62D 55/12; B62D 55/18
[52] U.S. Cl. .......................... 305/197; 305/193; 305/199
[58] Field of Search ................................. 305/185, 193, 305/194, 195, 196, 197, 198, 199, 56, 57

[56] References Cited

U.S. PATENT DOCUMENTS

| | | | |
|---|---|---|---|
| 2,374,644 | 5/1945 | Bombardier | 305/197 X |
| 4,262,972 | 4/1981 | Falk | 305/163 |
| 4,472,164 | 9/1984 | Pusch et al. | 305/199 X |
| 5,393,134 | 2/1995 | Oertley | 305/193 X |

FOREIGN PATENT DOCUMENTS

| | | | |
|---|---|---|---|
| 2306863 | 11/1976 | France | 305/197 |
| 2818409 | 11/1979 | Germany | 305/57 |

*Primary Examiner*—Russell D. Stormer
*Attorney, Agent, or Firm*—Peter A. Taucher; David L. Kuhn

[57] ABSTRACT

An improved drive connection between the track and drive sprocket of a track laying vehicle has a specially modified sprocket and track units. The track elements of the improved drive connection include links connecting the track units at their lateral, wells in the track units and a wall on one side of each well. The sprocket has an axle and a mounting flange or hub fixed to the axle. Outer gear teeth fixed to the hub flange protrude between the links when the sprocket engages the track while inner gear teeth fixed to the hub engage the specially configured bearing surfaces in the wells. The sprocket includes a continuous land surface having an annular portion between the inner and outer teeth and having other portions between the inner teeth. The continuous land surface contacts the walls where the sprocket engages the track. At least some of the teeth have inserts at tooth bearing surfaces, the inserts comprised of a matrix more elastic than the teeth and inclusions in the matrix more wear resistant than the teeth. The inserts have crowned surfaces protruding outward from the tooth bearing surfaces so that the inserts accept a majority of load force directed at the tooth bearing surfaces.

8 Claims, 4 Drawing Sheets

DOUBLE DRIVE SPROCKET

GOVERNMENT USE

The invention described here may be made, used and licensed by or for the U.S. Government for governmental purposes without paying me royalty.

BACKGROUND AND SUMMARY

My invention relates to track laying vehicles such as tanks and is particularly directed at the vehicles' connections between tracks and sprockets driving the tracks.

One drawback of tracked vehicles is the high rate of wear on the track and associated components such as road wheels and drive sprockets. A particular concern is wear and fatigue of teeth on drive sprockets. I address this concern by an improved double drive sprocket and an improved connection between this sprocket and the track.

My sprocket and connection has outer gear teeth on the sprocket. The outer gear teeth mesh with track links connecting a row of individual track units together. The sprocket has additional, inner gear teeth engaging sinusoidal surfaces in wells of the track units. The sprocket has a continuous land surface which has an annular zone between the inner and outer teeth and which has land surface portions between the inner teeth. The annular land zone contacts surfaces around the wells when the sprocket engages the track. The inner teeth, the outer teeth, or both, have inserts at tooth bearing surfaces. The inserts comprise a matrix of material more elastic than the teeth and have inclusions within the matrix more wear resistant than the teeth. Surfaces of the inserts protrude outward from the teeth's bearing surfaces so as to accept most of the load directed at the teeth and to maintain a variable tolerance gap between the teeth.

DETAILED DESCRIPTION

Figure 1:
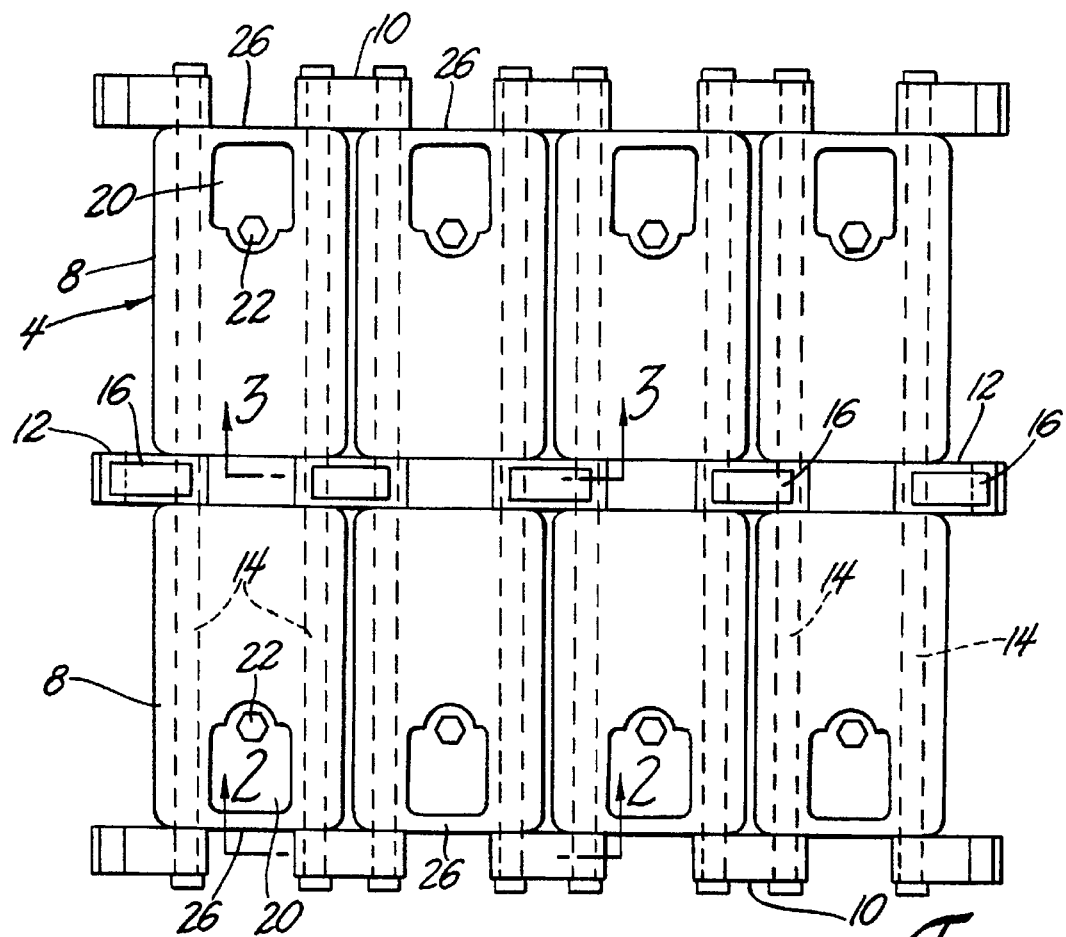
FIG. 1 is a plan view of a section of track from a track laying vehicle.
Figure 2:
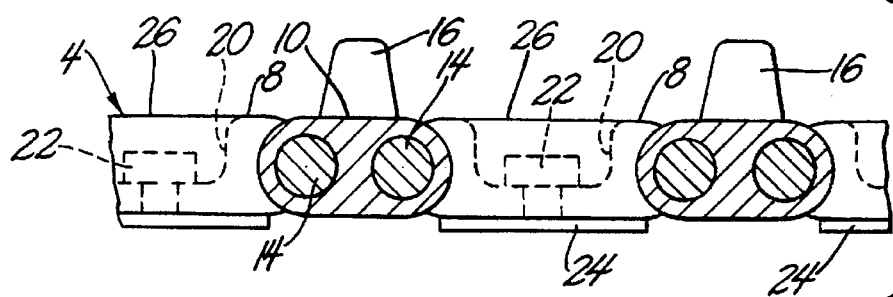
FIG. 2 is a sectional view taken along line 2—2 in FIG. 1
Figure 3:
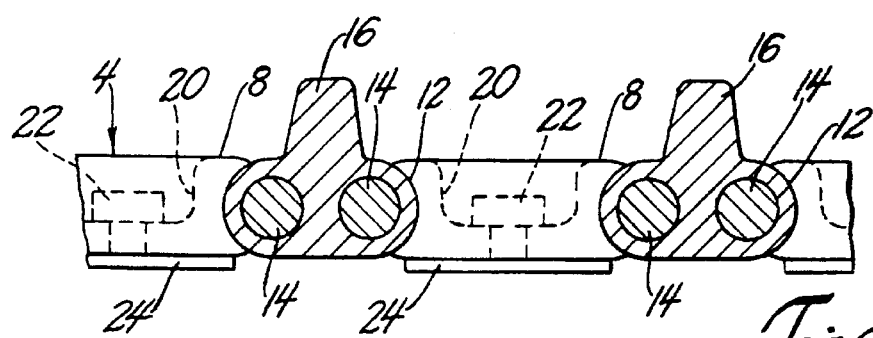
FIG. 3 is a sectional view taken along line 3—3 in FIG. 1.
Figure 11:
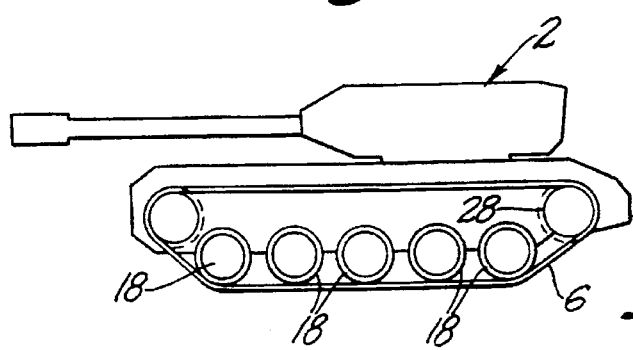
FIG. 11 is a side elevational view of a track laying vehicle having the aforementioned track and sprocket thereon.

In FIG. 1 is a segment 4 of a continuous band 6 of track, the band being shown on military vehicle 2 in FIG. 11. Segment 4 includes individual track units 8, outer links 10 at the outer lateral edges of the track units and inner links 12 at inner lateral edges of the track units. The track units and various links are conventionally Joined by track pins 14. Inner links 12 have center guides 16 which engage annular channels (not shown) in road wheels 18 (FIG. 11) which roll upon band 6. Wells 20 are defined at outer edges of the track units between pairs of track pins 14 journalled through each unit. Conventionally, the wells are used to give access to bolts 22, by which ground engaging pads 24 (FIGS. 2 and 3) are fixed to track units 8. Wells 20 also reduce the weight of the track units. Between wells 20 and the outer edges of track units 8 are walls 26 integral with the track units.

Figure 4:
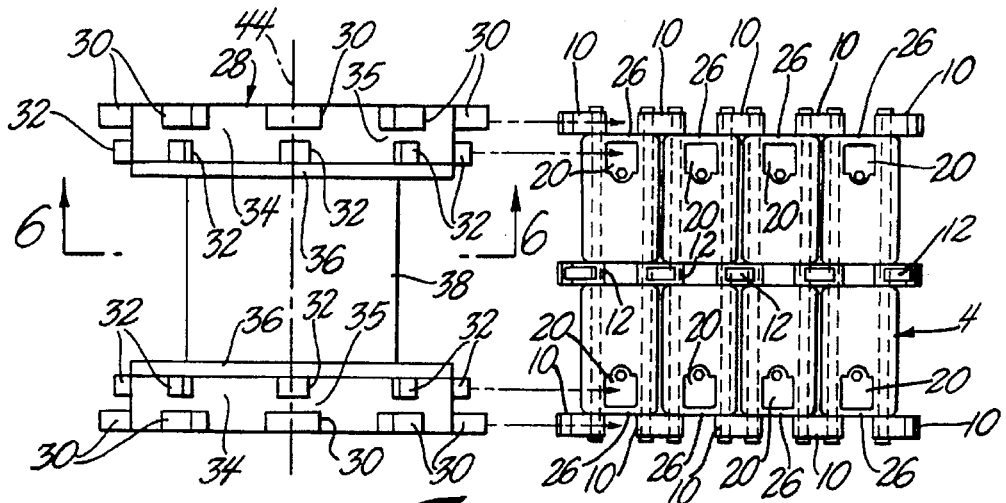
FIG. 4 is a plan view of an improved sprocket adjacent the track section, gear teeth of the sprocket being aligned with gear engaging components of the track section.

In FIG. 4 is an improved double drive sprocket 28 which drives band 6. Sprocket 28 has outer gear teeth 30 which fit between outer links 10 and has inner gear teeth 32 which enter wells 20, the teeth bearing against respective surfaces of the outer links or wells when sprocket 28 drives band 6. The toothed or gear portions of sprocket 28 mount to hub plates or flanges 36, which are fixed to or integral with sprocket axle 38.

Sprocket 28 has annular lands 34 which bear upon the tops of walls 26 and adjoining portions of track units 8 when the sprocket engages band 6. Central annular zones 35 of the lands are bordered by, and are axially between, teeth 30 and 32. Put another way, central zones 35 lie between different annular sets of teeth, one set comprised of teeth 30 and the other set comprised of teeth 32. These zones provide added area to the bearing surfaces on sprocket 28 by which the sprocket exerts a reaction force against tension of the band of track 6. Conventionally, track tension is resisted by only the sprocket teeth and the parts of the land which is between teeth of the same annular set. Because of central zones 35, the portions of the land space circumferentially between teeth of the same set are subjected to less wear from track tension.

Figure 5:
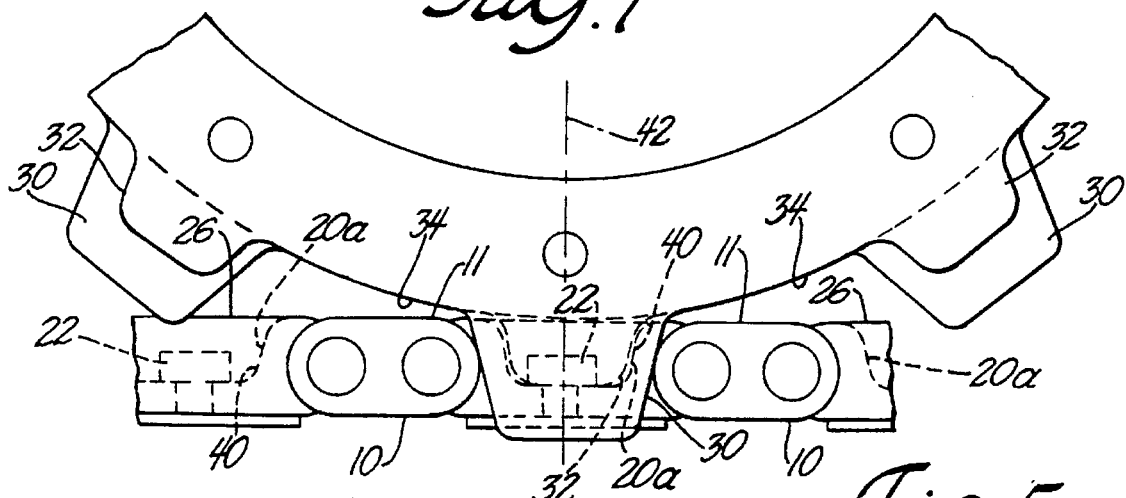
FIG. 5 is a detail view showing the engagement between gear teeth of the sprocket and the gear engaging components of the track section.
Figure 6:
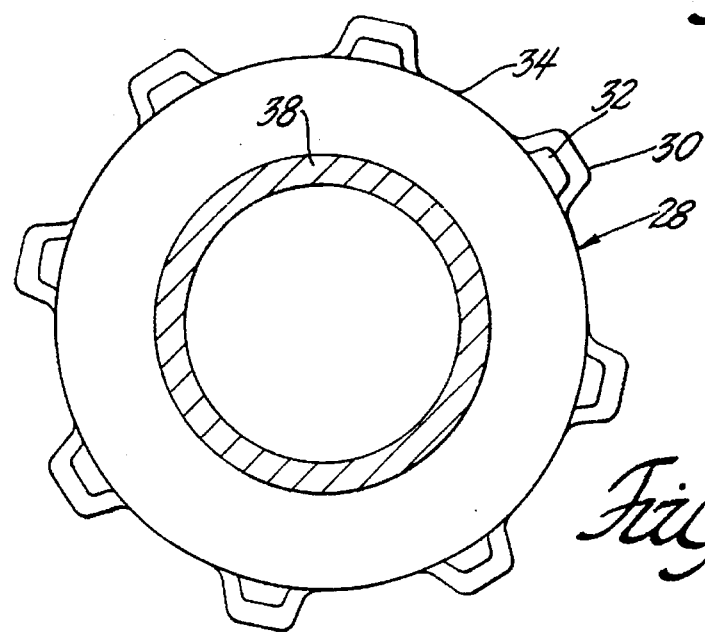
FIG. 6 is a sectional view taken along line 6—6 in FIG. 4.

FIG. 5 is a detail view showing how teeth 30, teeth 32 and land 34 engage a section of the track. In that figure, the gear engaging faces 40 of the wells are different from corresponding walls in previous figures, and the FIG. 5 wells are therefore designated as 20a. Walls 40 are slanted outward relative to wells 20a, and are more slanted than the corresponding walls relative to a radial reference line 42 passing through sprocket axis 44 (FIG. 4). Additionally, walls 40 have a sinusoidal curvature and are more curved than the corresponding walls in wells 20, whereby wall 40 a has a profile which mates well with a gear tooth. The portion of land 34 between outer teeth 30 will bear upon the radially inner surface 11 of link 10 and the portions of land 34 between inner teeth 32 will bear on the tops of walls 26.

Figure 7:
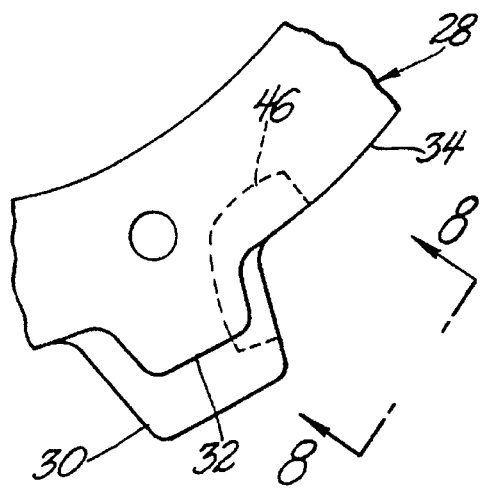
FIG. 7 is a side elevational detail view showing a wear insert for a sprocket gear tooth.
Figure 8:
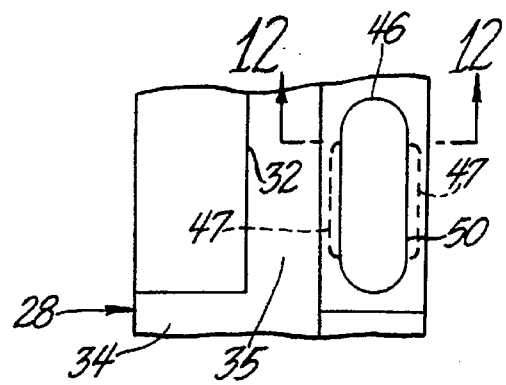
FIG. 8 is a view taken along line 8—8 in FIG. 7.

FIG. 7 shows a portion of sprocket 28 wherein the root area of outer tooth 30 has a wear insert 46, which can be instead placed in inner tooth 32 or which can be placed both in teeth 30 and teeth. 32. The insert is comprised of a resinous matrix of tough, resilient material that has greater flexibility than the metal of tooth 30 surrounding the material. Within the matrix are ceramic inclusions which are harder and more abrasion resistant than the matrix material and the metal of tooth 30. The material of the insert has been described in U.S. Pat. No. 5,141,299 to Korpi and that patent is hereby incorporated herein by reference.

Figure 12:
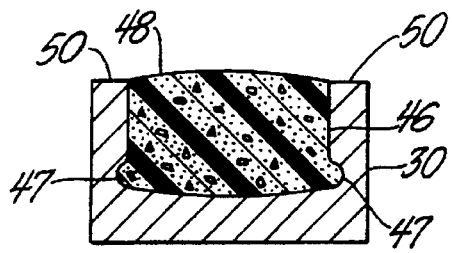
FIG. 12 is a sectional view taken along line 12—12 in FIG. 8.

As can be seen in FIG. 12, insert 46 has lateral bulges 47 by which the insert is anchored in tooth 30. Insert 46 also has a crowned bearing surface 48 that protrudes slightly beyond the general plane defined by the tooth's bearing surface 50. Consequently, when outer link 10 presses against tooth 30, this link will contact bearing surface 48 and compress insert 46 so that the insert takes the majority of the bearing load, and until sufficiently worn, the insert will maintain a very slight gap between tooth 30 and link 10. Because insert 46 is compressed and creates the aforementioned gap, the insert alleviates an undesired phenomenon I call mismatching. Mismatching may occur among the sprocket's sets of four teeth, each set comprised of two opposed outer teeth 30 and the two inner teeth 32 therebetween. Mismatching occurs if not all the teeth of a set bearingly contact links 10 or wells 20a when the set engages the track; that is, one or more of the teeth in a set come close to a complimentary bearing portion of link 10 or well 20a but make no or insufficient contact. The cause of mismatching can be uneven wear on the sprocket teeth or uneven on the track or tolerance stack ups from manufacture of the sprocket or track. The compressibility of insert 46 allows it to take up looseness or slack among the various engagements between the teeth of a set and the track components. Consequently, surface 48 creates what I term a variable tolerance gap between teeth and track elements.

Figure 9:
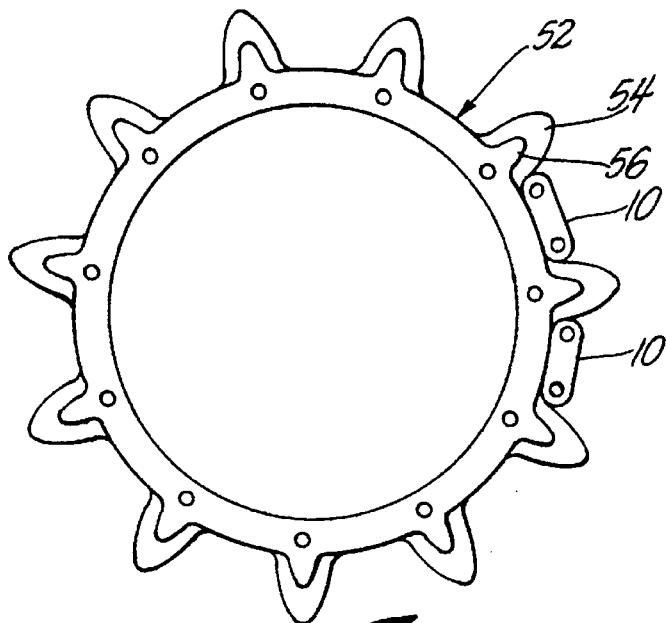
FIG. 9 is a side elevational view showing an alternate structure for gear teeth of the sprocket.
Figure 10:
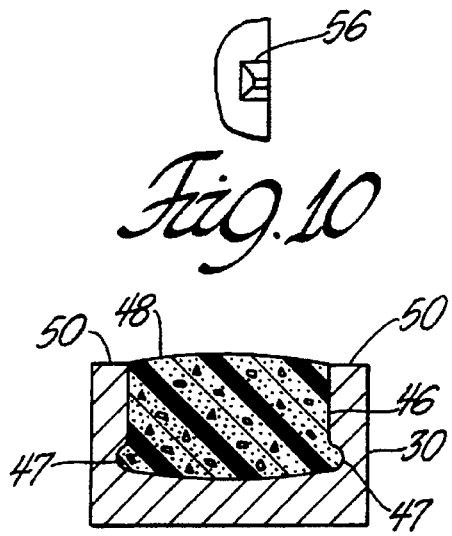
FIG. 10 a typical gear tooth from FIG. 9 as viewed when looking radially inward of the gear.

FIG. 9 shows an alternate sprocket 52, minus the mounting flange and axle, which is the same as sprocket 28 except that the profiles of the gear teeth have been changed. Sprocket 52 has outer gear teeth 54 and inner gear teeth 56 corresponding respectively to gear outer teeth 30 and inner gear teeth 32 of sprocket 28. Gear teeth 54 and 56 are radially longer and more pointed than their counterparts on sprocket 28. A view, looking radially inward of sprocket 52, of a typical inner sprocket tooth 56 is shown in FIG. 10. As to outer teeth 54, they can be axially flat like teeth 30 or they can have a configuration similar to, but larger than, that of tooth 54 in FIG. 10. Representative track links 10 are shown in their positions between outer teeth 54.

Figure 13:
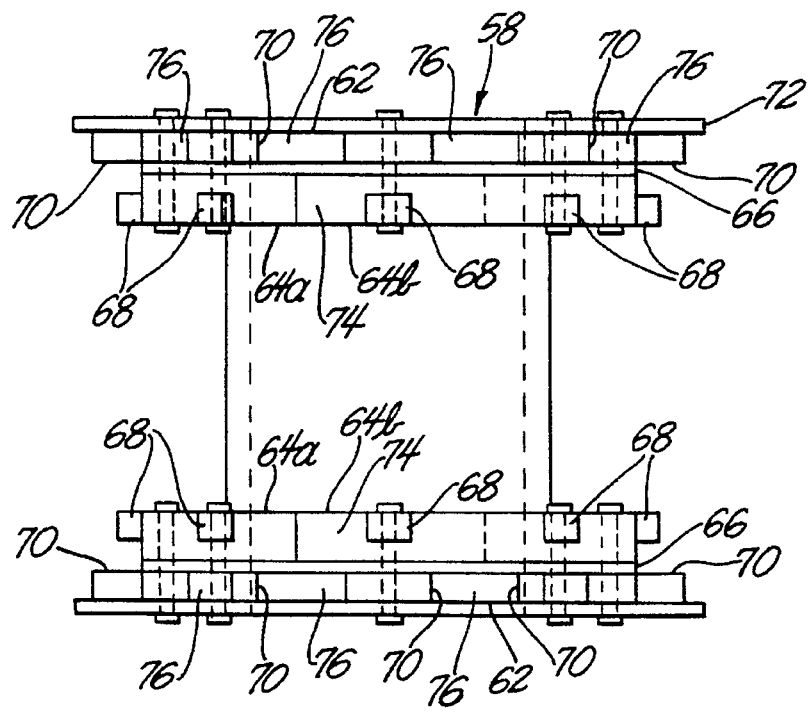
FIG. 13 is an alternate embodiment of the sprocket.
Figure 14:
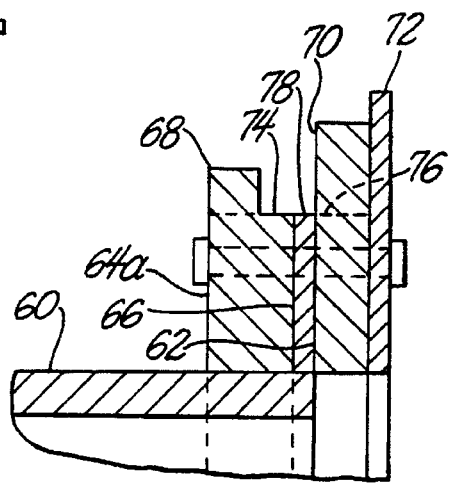
FIG. 14 is a detail sectional view showing the FIG. 13 embodiment's outer gear, inner gear component, outer gear tooth, inner gear tooth and mounting flange.
Figure 15:
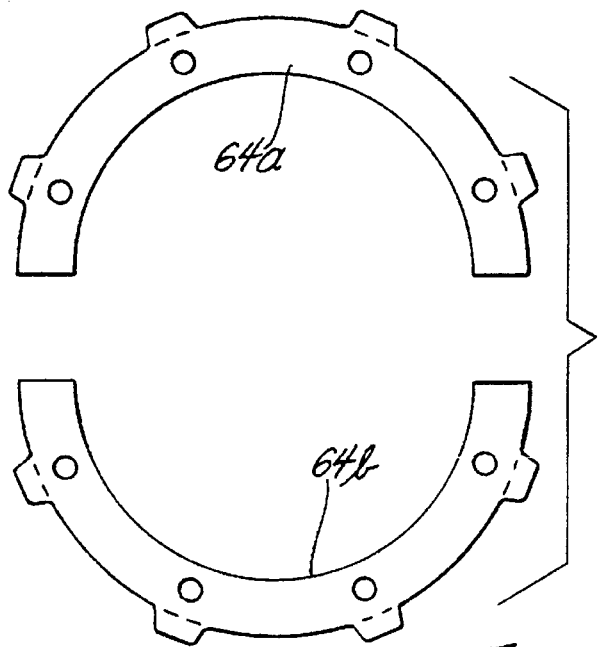
FIG. 15 is a side elevational view of inner gear segments of the FIG. 13 embodiment.

FIG. 13 shows another embodiment 58 of the double drive sprocket wherein sprocket axle 60 has integral therewith a conventional mounting flange 66 to which are bolted outer gear 62 and inner gear segments 64a and 64b, which are shown separately in FIG. 15. Gear 62 faces against the outer face of flange 66 and the inner gear segments face against the inner face of flange 66. Outer gear 62 has teeth 70 which engage links 10 in the same fashion as do outer teeth 30 in FIGS. 4 and 5, and inner gear segments 64a and 64b have inner teeth 68 which engage wells 20 or 20a as shown in those figures. Conventional annular guard plates 72 can be mounted to the outside of outer gears 62.

Inner gear segments 64a and 64b define a continuous inner land surface 74 that has arcuate portions between teeth 68 and that defines an annulus axially between flange 66 and the inner teeth. Outer gear 62 defines land surfaces 76 between outer teeth 70, land surfaces 76 preferably being flush with land surface 74. It also may be preferred to have the circumferential edge 78 of flange 66 flush with land surfaces 74 and 76, as shown in FIG. 5. By this design, the mounting flange edge 78, inner gear land surface 74 and outer gear land surface 76 cooperate to form a continuous land surface. In the alternative, edge 78 can be recessed relative to land surfaces 74 and 76 to protect the mounting flange.

I wish it to be understood that I do not desire to be limited to the exact details of construction or method shown herein since obvious modifications will occur to those skilled in the relevant arts without departing from the spirit and scope of the following claims.

What is claimed is:

1. A drive connection of a tracked vehicle, comprising:

track units of the tracked vehicle;

a drive sprocket of the vehicle, the drive sprocket connected to the track units;

lateral edges of the track units;

links connecting the track units at the lateral edges;

wells defined by the track units;

a wall forming one side of each well;

an axle of the drive sprocket;

a mounting flange fixed to the axle;

an outer set of sprocket teeth fixed relative to the mounting flange, the teeth of the outer set protruding between the links where the sprocket engages the track;

an inner set of sprocket teeth fixed relative to the mounting flange;

well bearing surfaces in the wells sloped outwardly relative to the wells, the teeth of the inner set engaging the well bearing surfaces where the sprocket engages the track;

a continuous land surface having an annular portion between the inner and outer sets of teeth and having other portions between teeth of the inner set, wherein the annular portion contacts the walls where the sprocket engages the track;

tooth bearing surfaces on at least one of the sets of teeth;

inserts at the tooth bearing surfaces, the inserts comprised of a matrix more elastic than the teeth of the one set, the inserts further comprised of inclusions within the matrix of material more wear resistant than the teeth of the one set;

means for creating a variable tolerance gap between teeth and track components, the creating means comprising surfaces of the inserts protruding outward from the tooth bearing surfaces.

2. The drive connection of claim 1 further comprising:

outer land surfaces between teeth of the outer set, the outer land surfaces flush with the continuous land surface;

wherein contact exists between radially inner surfaces of the links and the outer land surfaces where the sprocket engages the track.

3. The drive connection of claim 1 wherein the teeth of the inner set and the well bearing surfaces have matched sinusoidal profiles.

4. The drive connection of claim 1 wherein the connection further comprises:

an outer portion of the sprocket fixed to the flange and having the outer set of sprocket teeth thereon;

an outer land on the outer portion of the sprocket flush with the continuous land;

an inner portion of the sprocket fixed to the flange and having the inner set of sprocket teeth thereon;

wherein the continuous land is on the inner portion of the sprocket.

5. The drive connection of claim 4 wherein:

The inner portion of the sprocket is comprised of a plurality of segments fixed to an axially inner surface of the flange; and the outer portion of the sprocket is fixed to an axially outer surface of the flange.

6. The drive connection of claim 5 wherein a circumferential edge of the flange is flush with the land surfaces.

7. A drive connection of a tracked vehicle, comprising:

track units of the tracked vehicle;

a drive sprocket of the vehicle, the drive sprocket connected to the track units;

links connecting the track units;

wells defined by the track units;

a mounting flange on the sprocket;

a first set of sprocket teeth fixed relative to the mounting flange, the teeth of the first set protruding between the links where the sprocket engages the track;

a second set of sprocket teeth fixed relative to the mounting flange;

well bearing surfaces in the wells, the teeth of the second set engaging the well bearing surfaces where the sprocket engages the track;

a continuous land surface having an annular portion between the first and second sets of teeth, the continuous land surface having other portions between teeth of the second set, wherein the annular portion contacts the track at locations where the sprocket engages the track;

inter-tooth land surfaces between teeth of the first set, the inter-tooth land surfaces flush with the continuous land surface and bearing on a radially inner surface of the track at points where the teeth of the second set engage the track;

inserts on at least one of the sets of teeth, the inserts comprised of a matrix more elastic than the teeth of the one set, the inserts further comprised of inclusions within the matrix of material more wear resistant than the teeth of the one set;

means for accepting the majority of load forces directed at teeth, the accepting means comprising surfaces of the inserts protruding outward from the teeth of the one set so that part of the inserts are between bearing surfaces of the teeth of the one set and the links at locations where the sprocket engages the track.

8. A drive connection of a tracked vehicle, comprising:

track units of the tracked vehicle;

a drive sprocket of the vehicle, the drive sprocket connected to the track units;

links connecting the track units;

wells defined by the track units;

a mounting flange on the sprocket;

a first set of sprocket teeth fixed relative to the mounting flange, the teeth of the first set protruding between the links where the sprocket engages the track;

a second set of sprocket teeth fixed relative to the mounting flange;

well bearing surfaces in the wells, the teeth of the second set engaging the well bearing surfaces where the sprocket engages the track;

a continuous land surface having an annular portion between the first and second sets of teeth, the continuous land surface having other portions between teeth of the second set, wherein the annular portion contacts the track at locations where the sprocket engages the track;

inter-tooth land surfaces between teeth of the first set, the inter-tooth land surfaces flush with the continuous land surface and bearing on a radially inner surface of the track at points where the teeth of the second set engage the track.

* * * * *